Figure 7:
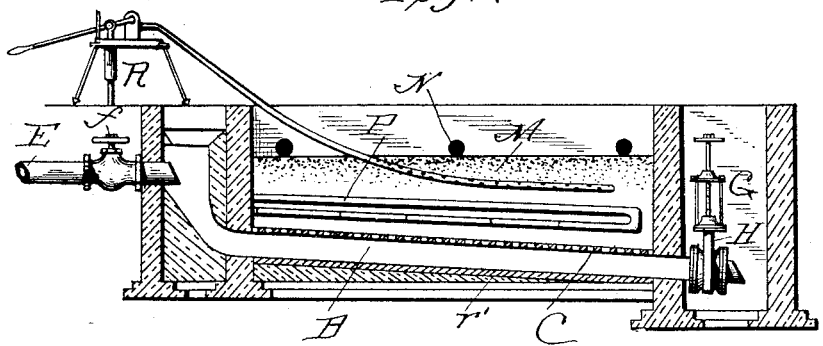

(No Model.) 3 Sheets—Sheet 1.
W. D. SCOTT-MONCRIEFF.
TREATMENT OF SEWAGE AND APPARATUS THEREFOR.
No. 530,622. Patented Dec. 11, 1894.
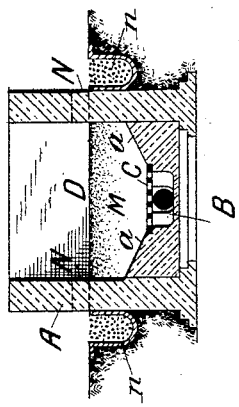
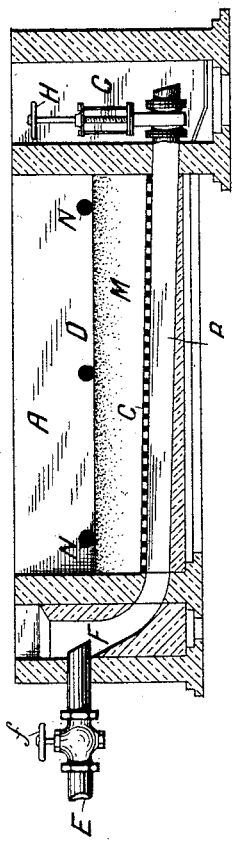
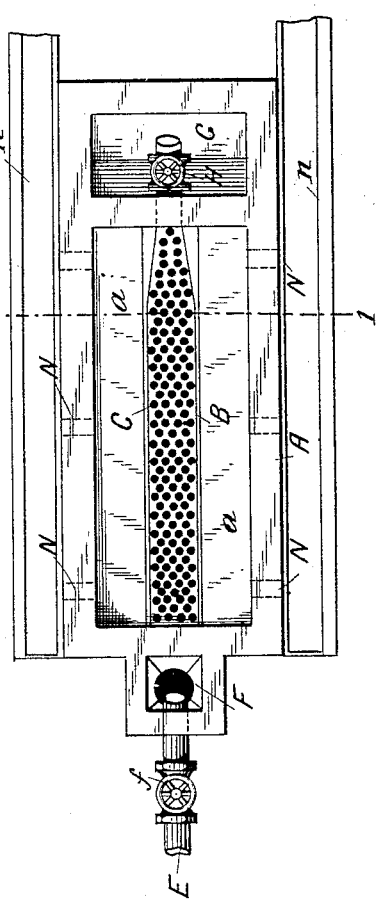

(No Model.) 3 Sheets—Sheet 2.
W. D. SCOTT-MONCRIEFF.
TREATMENT OF SEWAGE AND APPARATUS THEREFOR.
No. 530,622. Patented Dec. 11, 1894.
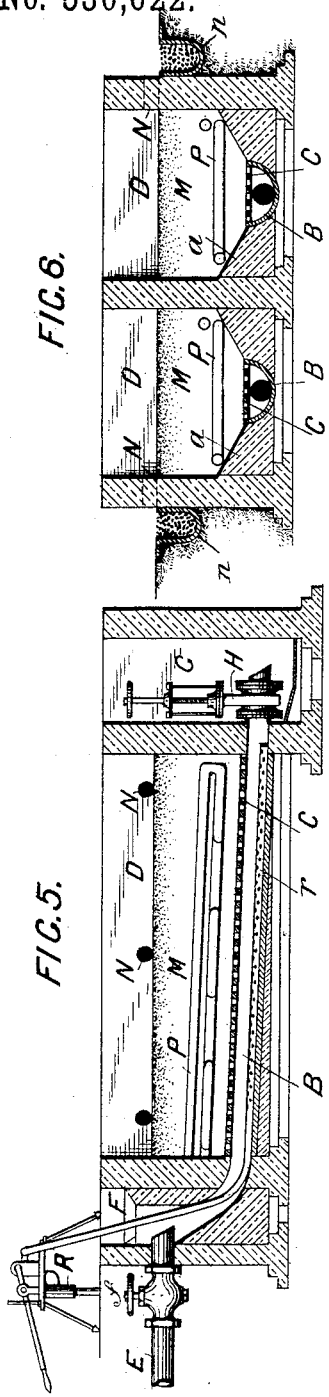
Witnesses
E. B. Bolter
A. M. Linton
Inventor:
William Dundas Scott-Moncrieff
By Richards & R
his Attorneys.

(No Model.) 3 Sheets—Sheet 3.
W. D. SCOTT-MONCRIEFF.
TREATMENT OF SEWAGE AND APPARATUS THEREFOR.

No. 530,622. Patented Dec. 11, 1894.

UNITED STATES PATENT OFFICE.

WILLIAM D. SCOTT-MONCRIEFF, OF LONDON, ENGLAND.

TREATMENT OF SEWAGE AND APPARATUS THEREFOR.

SPECIFICATION forming part of Letters Patent No. 530,622, dated December 11, 1894.

Application filed November 21, 1892. Serial No. 452,698. (No model.) Patented in England August 22, 1891, No. 14,181.

*To all whom it may concern:*

Be it known that I, WILLIAM DUNDAS SCOTT-MONCRIEFF, a subject of the Queen of Great Britain, residing at 86 Newman Street, in the county of London, England, have invented certain new and useful Improvements in the Treatment of Sewage and in Apparatus Therefor, (for part of which I have received Letters Patent in England, No. 14,181, dated August 22, 1891;) and I do hereby declare that the following is a full, clear, and exact description of the invention, which will enable others skilled in the art to which it appertains to make and use the same.

My invention relates to certain improvements in the treatment of sewage and the apparatus therefor, and has for its object to purify sewage and discharge a clear and inoffensive effluent. This I effect by the action of microbes which liquefy and break up the organic matters in the sewage. Hitherto it has been believed that the beneficent action of these organisms in the purification of effete matter could only be carried out in the presence of oxygen, and with this end in view experiments have been carried out almost exclusively in the direction of downward filtration, the object being to secure the largest amount of oxygen available by atmospheric contact during the operation. One obvious objection to this process is the necessity for preliminary straining or deposition of the coarser particles of the sewage to prevent clogging the filter. This straining or deposition, as a matter of fact, amounts to nothing more nor less than depriving the organisms of the greater proportion of their food supply, leaving a mass of filth which never enters the filter and consequently is never broken up or nitrified, and so constitutes a nuisance in itself. I have discovered that the total solid matter in ordinary sewage can be dealt with as the actual food supply of the organisms if it is properly conveyed to them. All that is required for this purpose is to concentrate the sewage in a comparatively small space, and to have a constant movement occurring. When this is done, there is no need for the same amount of oxygen as has hitherto been believed to be necessary.

It is also an essential part of the process that the enzymes of the saprophytic species which perform the work should be removed as soon as formed from that portion of the filter bed wherein it is believed that the production of micro organisms is most active.

The following among others are the organisms which it is the especial object of the apparatus to cultivate, namely: bacillus fluorrescens liquefaciens, bacillus subtilis, protean forms (particularly the proteus vulgaris), bacillus figurans, &c.

According to my invention, no preliminary straining of the sewage is necessary, the apparatus being so arranged that the bacteria multiply and unceasingly perform their functions, any previous removal of organic matter from ordinary sewage being detrimental to their action.

My invention comprises also special means for maintaining them healthy and vigorous. I also provide means for the further purification of the effluent obtained from the cultivation filtering bed. The apparatus I employ includes a tank, the lower part of which is below the level of the intake pipe, (also filtering material carried upon a perforated diaphragm,) beneath which there is a space or chamber, into which the crude sewage is led by a suitable pipe, the superficial area of the said chamber being considerably less than the full base of the tank. Provision is also made for the removal of inorganic detritus by means of suitable valves. The apparatus is such that by simple adaptation of its dimensions it is capable of dealing with any required volume of sewage, and is therefore applicable equally to public and private sanitation.

My invention includes also means for insuring the most favorable condition in the filtering material for the development of the micro organisms contained in sewage. Suitable inlet, outlet, flushing, and cleaning appliances are provided, and my invention includes also special means of resting and aerating the filtering material without interfering with the continuity of the treatment.

I have in the annexed drawings illustrated a single and a duplex apparatus applicable in ordinary cases and which I will now describe.

Figure 1 is a plan and Fig. 2 a longitudinal section of a single apparatus. Fig. 3 is a cross section on line 1—1 of Fig. 1. Fig. 4 is a plan with one perforated diaphragm removed, and Fig. 5 a longitudinal section of a duplex apparatus. Fig. 6 is a cross section on line 2—2 of Fig. 4. Fig. 7 is a view similar to that shown in Fig. 5 with the exception that the pipe leading from the pump is used as an air discharge pipe and extends into the filter for this purpose.

Similar letters refer to similar parts throughout the several views.

A is the tank, in the lower part of which is formed an inclined longitudinal chamber B, which is always less in superficial area than the total area of the tank itself. To this chamber the base of the tank is sloped as shown at $a$. Above the concentrating chamber B is a perforated diaphragm C, which may either be laid over the same as in Fig. 3, or a pipe or half pipe perforated on its upper side, as illustrated in Fig. 6 may conveniently be used instead. Thus the tank is practically divided into two superposed compartments B and D, the lower one B being the smaller of the two. The higher end of the lower compartment B communicates with the sewage intake pipe E through the vertical chamber and conduit F, a regulating valve $f$ being provided. The lower end of the compartment B communicates with a sludge pit G, or it may be with another similar apparatus for a repetition of the treatment, and it is controlled by a valve H.

M. is the filtering or intercepting material of any suitable kind, such as coke, charcoal, flints or the like, placed above the perforated diaphragm C, and filled to a level somewhat above the lip of intake pipe E, and N N are discharge orifices for the effluent. By this arrangement the sewage admitted at pipe E. flows through F into the confined chamber B beneath the diaphragm C, and (the valve H being closed) it is compelled to filter up through the perforations, of the diaphragm C and through the filtering material M, and finally escapes in a clarified state at the overflows N N. This combined concentration and movement provides the conditions favorable to the development of micro organisms which increase directly as the food supply, and continually encroach upon the same.

Sludge or deposit (which merely represents that portion of the organic matter which the organisms have not had time to liquefy), and inorganic detritus, may be removed from the concentrating compartment B when required by simply opening the penstock H and raking out or flushing. In order to maintain the conditions most favorable to the process in low temperature, I combine with the above described apparatus an arrangement of pipes P P as shown in Figs. 4, 5, and 6, for the circulation of hot water from a boiler P′ whereby the filtering material M may be maintained when necessary or advisable at the temperature most favorable to the growth and action of the micro organisms.

In order to provide for the resting, cleansing, and aeration of the filtering material without stopping the continuity of the treatment, I arrange the filters in pairs as illustrated in Figs. 4, 5, and 6, or in any suitable groups, and I provide a pumping apparatus as shown at R. which may perform one of two functions, viz: either to withdraw the liquid contents of the filter (which it is proposed to rest and aerate) and discharge the same into a filter which has been already rested and aerated, or alternatively, to use the said pumping apparatus for forcing air into the liquid contents of the filter at work beneath the diaphragm C so as to supply oxygen to the organisms when necessary or advisable. The pipe necessary for the suction of the liquid from beneath the diaphragm C is shown at $r$ in one case in hard lines, and at $r'$ Fig. 7 when used as an air discharge pipe. Suitable valves may be provided at $x$, $y$ as shown in Fig. 5, by which the pump may be adapted to supply either air or pump the material from one filter to the other. The detail arrangement of this pump is not essential and the one shown is representative of any suitable form or arrangement of pump.

The effluent obtained from the foregoing apparatus is clear and inoffensive, but in order to further nitrify any organic substances which may be left in it, I form carriers $n$ $n$ of suitable form in cross section, for example, as illustrated in Figs. 4 and 6, and fill them with coke-breeze, or other suitable material, and I zigzag them as shown in dotted lines to the right of Fig. 4 in confined sites to increase their length. In this manner the necessary conditions are provided for the development of further organisms which require a large amount of oxygen for their support and purifying action upon the effluent.

Such an apparatus may obviously be designed in various ways. It may be of iron, or suitable material, and the sewage may be introduced by gravity as described, or by pumping. Therefore I do not limit myself to any particular details of construction.

By making the concentrating conduit B of less capacity or contracted as compared with the filter bed of larger area above it and further by arranging the inlet of the crude material to said conduit at the extreme bottom thereof a result is obtained which is vital to the successful cultivation of the micro organisms as by this the crude material in the contracted conduit or chamber is kept constantly on the move passing forward and upward without any place of permanent deposit, thus preventing the accumulation of stale organic and fecal matter which would destroy or retard the action of the micro organisms.

I claim—

The herein described method of purifying sewage which consists in passing the sewage, without previous removal of the solid portions, under a suitable head, first through a concentrating chamber with contracted outlet openings in which the solid portions are retained until so far decomposed by the action of the micro-organisms that they can pass through the outlet openings, while the life products of the micro-organisms are allowed to pass out with the liquid and finer solid particles without delay, and then upward through a filter bed of suitable depth and of greater superficial area than said concentrating chamber, whereby the decomposition of the solid matters is substantially completed, substantially as described.

In witness whereof I have hereunto set my hand in presence of two witnesses.

WILLIAM D. SCOTT-MONCRIEFF.

Witnesses:
 JOSEPH C. CHAPMAN,
 C. P. A., 70 *Chancery Lane, London, W. C.*
 HENRY A. PRYOR,
 70 *Chancery Lane, London, W. C.*